United States Patent [19]
Lamnabhi et al.

[11] Patent Number: 5,060,064
[45] Date of Patent: Oct. 22, 1991

[54] ARRANGEMENT FOR INTERPOLATION IMAGES BY MOTION ESTIMATION AND COMPENSATION AND A TELEVISION STANDARD CONVERTER SYSTEM COMPRISING SUCH AN ARRANGEMENT

[75] Inventors: Moustanir Lamnabhi, Limeil Brevannes; Jean-Jacques Lhuillier, Saint Maur, both of France

[73] Assignee: U.S. Philips Corporation, New York, N.Y.

[21] Appl. No.: 460,326

[22] PCT Filed: Apr. 26, 1989

[86] PCT No.: PCT/NL89/00028
§ 371 Date: Feb. 6, 1990
§ 102(e) Date: Feb. 6, 1990

[87] PCT Pub. No.: WO89/10600
PCT Pub. Date: Nov. 2, 1989

[30] Foreign Application Priority Data
Apr. 29, 1988 [FR] France ................................. 8805775

[51] Int. Cl.$^5$ ................................................ H04N 7/01
[52] U.S. Cl. ................................. 358/105; 358/140
[58] Field of Search ................ 358/105, 136, 135, 140

[56] References Cited

U.S. PATENT DOCUMENTS

| | | | |
|---|---|---|---|
| 4,442,454 | 4/1984 | Powell | 358/167 |
| 4,777,530 | 11/1988 | Kondo | 358/105 |
| 4,853,775 | 8/1989 | Rouvrais et al. | 358/105 |

FOREIGN PATENT DOCUMENTS

2153625 8/1985 United Kingdom .
2172121 9/1986 United Kingdom .

OTHER PUBLICATIONS

"Determining Velocity Maps by Spatio-Temporal Neighborhoods from Image Sequences" Yachido; *Computer Vision, Graphics, and Image Processing* 21; pp. 262–279; Feb. '83.

*Primary Examiner*—Victor R. Kostak
*Attorney, Agent, or Firm*—Edward W. Goodman

[57] ABSTRACT

This arrangement for interpolating images by motion estimation and compensation includes a member for estimating motion in blocks (10) to form motion vectors assigned to picture element blocks and an interpolating member (120) for forming an image as a function of the motion vectors. The arrangement furthermore includes an assigning member (50) for assigning a vector from the candidate motion vectors ($D_1$, $D_2$, ... $D_L$) processed by the estimation member to each picture element.

9 Claims, 10 Drawing Sheets

ARRANGEMENT FOR INTERPOLATION IMAGES BY MOTION ESTIMATION AND COMPENSATION AND A TELEVISION STANDARD CONVERTER SYSTEM COMPRISING SUCH AN ARRANGEMENT

BACKGROUND OF THE INVENTION

1. Field of the Invention

The present invention relates to an arrangement for interpolating images by motion estimation and compensation, which arrangement includes a block-by-block motion estimation member to form motion vectors assigned to blocks of picture elements an and an interpolation member to form an image as a function of said motion vectors.

Arrangements of this type are used with great advantage, more specifically in the field of television. By knowing the motion vectors which define the displacement of the different successive picture elements, it is possible to form by interpolation an image of a good quality at an instant chosen between two consecutive images.

2. Description of the Related Art

This type of arrangement for which a motion estimation is used for an overall block of picture elements is well known. For this subject, reference is made to the article by C. CAFFORIO and ROCCA, entitled: "The differential method for image motion estimation" in Image sequence processing and dynamic scene analysis, T. S. Huang Ed., Berlin, Germany, Springer-Verlag, 1983, pp. 76–103.

If the blocks contain many picture elements, a first disadvantage is met. This disadvantage is caused by the fact that it may happen that picture elements of the same block are displaced from one image to the other by a clearly different amount, which consequently results in interpolated images of a poor quality.

When the blocks contain few elements, there is a second disadvantage as the motion estimation may be affected by noise and an image of a poor quality is obtained also then.

SUMMARY OF THE INVENTION

The present invention has for its object to provide an arrangement of the type defined above which supplies a motion vector for all the elements or some elements while remaining insensitive to noise.

To that end, such an arrangement is characterized in that it includes an assigning member for assigning one vector from candidate motion vectors processed by the estimation member for at least one image element denoted the current element.

The present invention also relates to a television standard converter system formed on the basis of such an arrangement. An example of a conversion is the example in which images appearing at a rate of 50 Hz are converted into images appearing at the rate of 60 Hz (or 59.94 Hz). It is, consequently, impossible to have the images coincide; the images to be formed at the rate of 59.94 Hz are obtained by interpolation of images appearing at 50 Hz. The following articles describe systems of this type: "Movement-compensated frame-frequency conversion of television signal" HOIROHISA YAMAGUCHI et al. IEEE Transactions on Communications, vol. COM-35, no. 10, October 1987. "HDTV-PAL Standards Converter" YUTALEA TANAKA et al. NHK Laboratories Note, January 1986, no. serie 326.

The quality of the images provided by these systems are based to a large extent on an appropriate valuation of the motion vector.

To interpolate sequences of images, an important characteristic of the invention in accordance with which an arrangement of the type defined above comprises a motion vector coherence test member to supply a validation signal for each motion vector assigned to an element, by comparing it with corresponding elements positioned in images of said sequence, provides the advantage that certain ambiguities in the determination of the motion vector are avoided. These ambiguities occur more specifically for small sized objects which move on a continuous background. Certain portions of the object will be provided with a good motion vector but other objects may be provided with a motion vector corresponding to the background.

The interpolated image will show discontinuities in the reproduction of this object and these discontinuities will appear in different locations of the image during an image sequence. The object will finally appear in a degraded quality. Thanks to this characteristic of the invention, this degradation and these discontinuities are prevented to a large extent by comparing the motion vectors in a spatial domain surrounding the picture element as well as in domains surrounding the corresponding elements in different images.

BRIEF DESCRIPTION OF THE DRAWINGS

The following description, which is given by way of non-limitative example with reference to the accompanying drawings, will make it better understood how the invention can be put into effect.

DESCRIPTION OF THE PREFERRED EMBODIMENT

Figure 1:
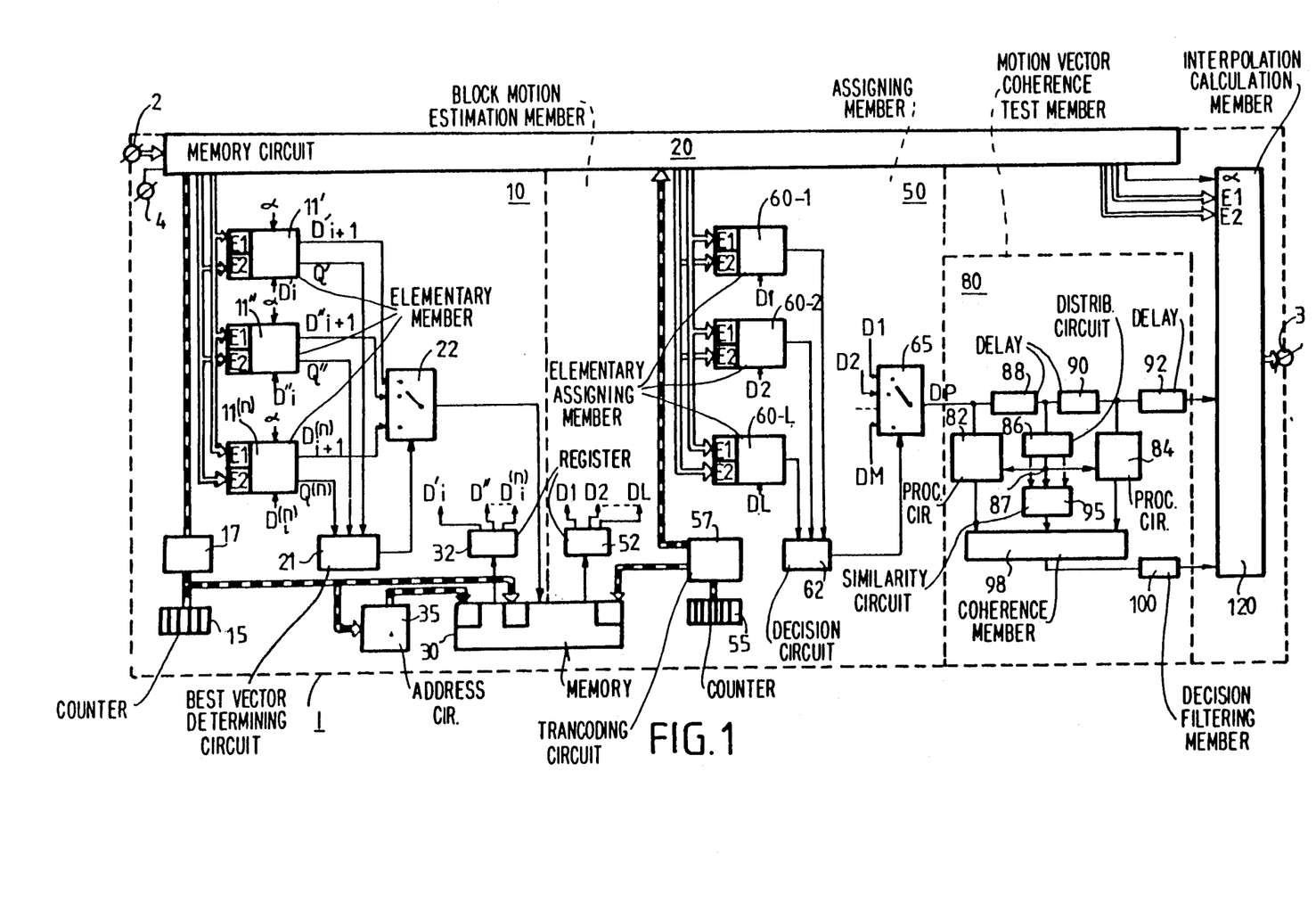
FIG. 1 shows a circuit diagram for the interpolation of images in accordance with the invention.

In FIG. 1, reference numeral 1 denotes the arrangement according to the invention. This arrangement comprises first of all a first port 2 for receiving image information components and a second port 3 for supplying the interpolated image. This interpolated image depends on a parameter $\alpha$ applied to a third port 4. This parameter $\alpha$ is defined in the following manner, for which reference is made to FIG. 2. Let E1 and E2 be consecutive images which appear at instants separated by a duration TR. The arrangement of the invention proposes to supply, by interpolation a missing image M positioned in time at $\alpha$.TR of E1 and at $(1-\alpha)$. TR of E2 wherein $\alpha$ is comprised between 0 and 1.

Figure 2:
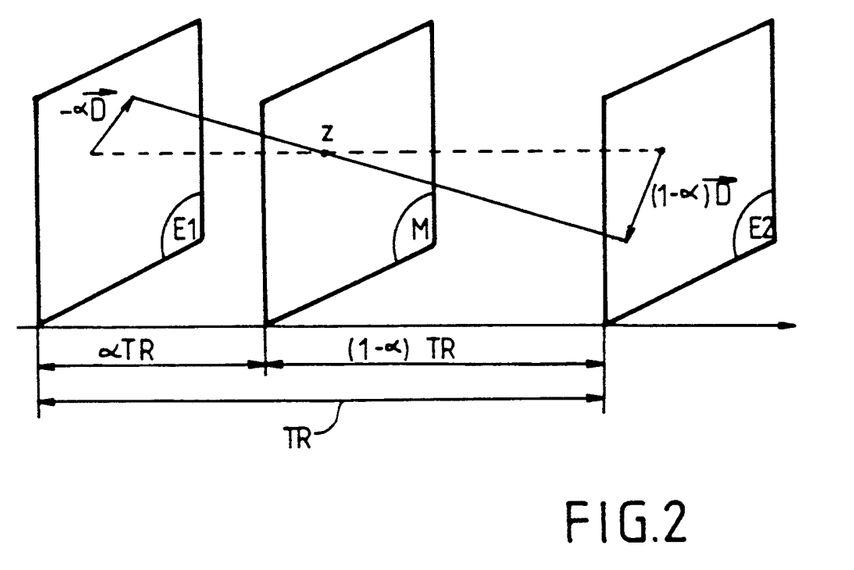
FIG. 2 shows the structure of the image to be interpolated from two existing images.

If the vector representing the coordinates of a picture element is called $\vec{z}$ and $I(\vec{z},M)$ is denoted the luminance of an element having a coordinate $\vec{z}$ of the image M, this luminance is derived by interpolation in accordance with the formula:

$$I(\vec{z},M) = [(1-\alpha) \cdot I(\vec{z} - \alpha \vec{D}, E1) + \alpha I(\vec{z} + (1-\alpha)\vec{D}, E2]$$

where $\vec{D}$ is the motion vector, $\vec{D}$ representing the shift of the element defined by z, between the images E1 and E2.

To establish the missing image, formula (1) is applied for all the elements $\vec{z}$ of this missing image.

Figure 3:
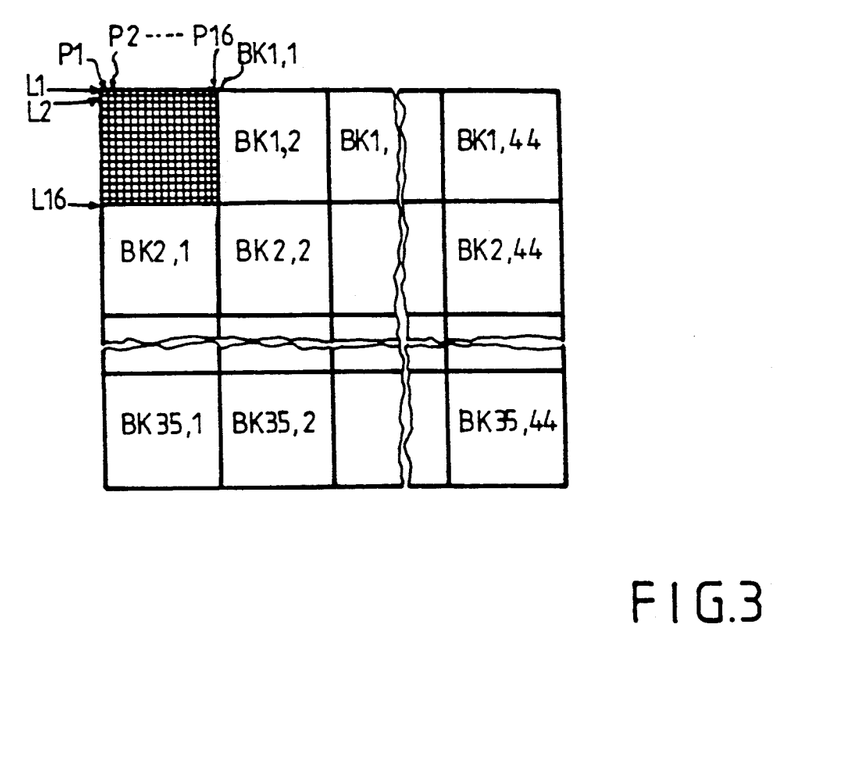
FIG. 3 shows the splitting of the images into picture elements (pixels) and into element blocks.

To this effect, the arrangement according to the invention includes first of all a block motion estimation member 10. This member will produce for a block of, for example 16*16 picture elements, a vector $\vec{D}$. FIG. 3 shows the decomposition of an image into blocks. Each image is composed of 1540 blocks. These blocks are organized into 35 lines of 44 blocks each. Thus the blocks $BK_{1,1}$; $BK_{1,2}$; ... $BK_{1,44}$ are associated with the first line, the blocks $BK_{2,1}$; $BK_{2,2}$; ... $BK_{2,44}$ are associated with the second line, and so forth up to blocks $BK_{35,1}$; $BK_{35,2}$; ... $BK_{35,44}$ which are associated with the thirty-fifth lines. Each block is formed by 16 lines $L_1, L_2, L_3, \ldots L_{16}$ each of which contains 16 picture elements $P_1, P_2, \ldots P_{16}$: this is only shown in detail for the block $BK_{1,1}$. Thus the member 10 will produce a motion vector $\vec{D}_{m,n}$ for each block $BK_{m,n}$ of the image M.

To provide this vector $\vec{D}_{m,n}$ the member 10 is provided with a plurality of elementary members 11', 11'', ... $11^{(n)}$. These members supply a motion vector $D'_{i+1}$, $D''_{i+1}, \ldots D^{(n)}_{i+1}$ for a given block, defined by the contents of a block counter 15. This counter 15, which is associated with a decoding circuit 17, addresses a memory circuit 20 which contains all the information components of the luminance of the images E1 and E2 from which the image M is made. This memory circuit 20 only applies to the elementary members 11', 11'', ... $11^{(n)}$, the information components which are necessary to establish the values of the motion vectors $D'_{i+1}$, $D''_{i+1}, \ldots D^{(n)}_{i+1}$. Only one from among all the vectors $D'_{i+1}$, $D''_{i+1}, \ldots D^{(n)}_{i+1}$ will be retained. A circuit 21 determines the best vector in accordance with a certain criterion defined by a quality information $Q'$, $Q'', \ldots Q^{(n)}$ produced by each elementary member 11', 11'', ... $11^{(n)}$. As a function thereof, the circuit 21 controls the position of a multiplexer 22 to ensure that the retained vector $D_{m,n}$ is stored in a second memory circuit 30 in a location assigned to the block $BK_{m,n}$ by address circuit 35. In accordance with the preferred mode of the invention, the elementary members operate in accordance with the C. CAFFORIO and ROCCA algorithm described in said article. Any other algorithm supplying motion vectors will also do and falls of course within the scope of the invention.

In accordance with the preferred algorithm of the invention, a correction value $\delta$ is added to a previous value in accordance with an iterative process so that it can be written that:

$$D_{i+1} = D_i + \delta \tag{2}$$

Figure 4:
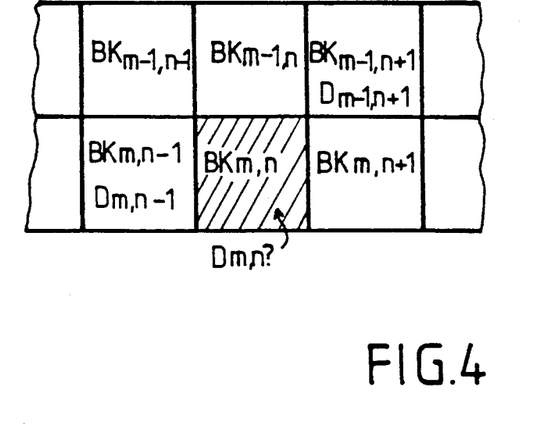
FIG. 4 shows how the initial vectors are chosen in relation to the blocks already processed.

This operation can be effected several times. But we have found that one single iteration was sufficient to obtain adequate performances of the arrangement according to the invention. The initial values can be taken by considering the motion vector of already calculated adjacent blocks. In accordance with a characteristic of the invention, for a determination of the vector $D_{m,n}$, $D_{m-1,n+1}$ and $D_{m,n-1}$ could be taken as the initial values (see FIG. 4) which are the motion vectors assigned to the previously processed blocks $BK_{m-1,n+1}$ and $BK_{m,n-1}$ and the vectors have already been calculated. The zero motion vector may also be taken into consideration. These vectors are made available at the outputs of a register 32 which is connected to the memory circuit 30.

To determine $D_{i+1}$, the elementary members 11 perform the operation indicated by the equation (2) wherein:

$$\delta = \begin{vmatrix} \delta_H \\ \delta_V \end{vmatrix}$$

$$\delta_H = \frac{\left[\sum_A (\nabla_V I)^2\right]\left[\sum_A (DFD \cdot \nabla_H I)\right] - \left[\sum_A (\nabla_H I \cdot \nabla_V I)\right]\left[\sum_A (DFD \cdot \nabla_V I)\right]}{\left[\sum_A (\nabla_H I)^2\right]\left[\sum_A (\nabla_V I)^2\right] - \left[\sum_A (\nabla_H I \cdot \nabla_V I)\right]^2} \tag{3}$$

$$\delta_V = \frac{\left[\sum_A (\nabla_V I)^2\right]\left[\sum_A (DFD \cdot \nabla_H I)\right] - \left[\sum_A (\nabla_H I \cdot \nabla_V I)\right]\left[\sum_A (DFD \cdot \nabla_V I)\right]}{[\sum (\nabla_H I)^2][\sum (\nabla_V I)^2] - [\sum(\nabla_H I \cdot \nabla_V I)]^2} \tag{4}$$

wherein A represents the 16*16 picture elements of the block for which the calculations are made wherein:

$$DFD = DFD(\vec{Z},\vec{D}) = I[\vec{z} + (1 - \alpha)\vec{D},E2] - I(\vec{z} - \alpha\vec{D},E1) \quad (5)$$

$$\nabla_H I = \nabla_H I(z,M) = (1 - \alpha)\nabla_H I(\vec{z} - \alpha\vec{D},E1) + \quad (6)$$

$$\alpha \nabla_H I[\vec{z} + (1 - \alpha)\vec{D},E2]$$

$$\nabla_V I = \nabla_V I(z,M) = (1 - \alpha)\nabla_V I(\vec{z} - \alpha\vec{D},E1) + \quad (7)$$

$$\alpha \nabla_V I[\vec{z} + (1 - \alpha)\vec{D},E2]$$

$$\text{if } \vec{Z} = \begin{vmatrix} x \\ y \end{vmatrix} \text{ and } E = E1 \text{ or } E2,$$

$$\nabla_H I(Z,E) = \frac{1}{2}[I(X + \Delta X,E) - I(X - \Delta X,E)] \quad (8)$$

$$\nabla_V I(Z,E) = \frac{1}{2}[I(Y + \Delta Y,E) - I(Y - \Delta Y,E)] \quad (9)$$

$\Delta X$, $\Delta Y$ represent the horizontal and vertical distances between two picture elements.

The quantity $Q^{(j)}$ analyzed by the circuit 21 relative to a vector $D^{(j)}_{i+1}$ is given by:

$$Q^{(j)} = {}_A\Sigma[DFD]^2 - [\delta_H {}_A\Sigma DFD.\nabla_H I + \delta_V {}_A\Sigma DFD.\nabla_V I] \quad (10)$$

The retained vector $D^{(j)}_{i+1}$ will be the vector for which the quantity $Q^{(j)}$ is minimal.

The arrangement according to the invention also includes an assigning member 50 which assigns a shift vector DP to each picture element M. Associated with each element are L candicate vectors $D_1, D_2, \ldots D_L$ which are motion vectors associated with blocks near the block containing the element. In the preferred embodiment nine candidate vectors have been selected for an element belonging to a block $BK_{m,n}$; these vectors are:

$D_{m-1,n-1}$
$D_{m-1,n}$
$D_{m-1,n+1}$
$D_{m,n-1}$
$D_{m,n}$
$D_{m,n+1}$
$D_{m+1,n-1}$
$D_{m+1,n}$
$D_{m+1,n+1}$

These vectors are taken from the memory circuit 30 and are stored for the calculation in a register 52. To that end the memory circuit 30 is addressed by a transcoding circuit 57 which is driven by a picture element counter 55, this transcoding circuit 57 more specifically determining for the current element the candidate motion vectors to be processed by the assigning member 50. Different elementary assigning members 60-1, 60-2, ... 60-L each perform a processing operation on each one of the L candidate vectors $D_c(c=1, \ldots L)$. A decision circuit 62, which receives the result from the different elementary assigning members, determines the vector DP taken from among these candidates. This vector is selected by means of a change-over switch 65 which is controlled by the decision circuit 62. To make this selection, the function $CT(z,D_c)$ associated with the current element and each candidate motion vector is examined in the region of the decision circuit 62. This function $CT(z,D_c)$ is such that:

$$CT(z,D_c) = {}_B\Sigma|DFD(z,D_c)| \quad (11)$$

B is a domain of reduced size relative to A. B is, for example, constituted by 8 elements surrounding the current element.

The retained vector $D_c$ is the vector for which the value $CT(z,D_c)$ is minimal.

The arrangement according to the invention furthermore includes a motion vector coherence test member 80. For a proper understanding of the significance of such a member, reference is made to FIG. 5. In this FIG. 5, a horizontal sectional view of a sequence of images is shown in E1, E2, E3, E4. OB represents an object which is displaced along this section. In the image E1, the object occupies the position OB1, in the image E2 the object occupies the position OB2, in the image E3 the object occupies the position OB3, in the image E4 the object occupies the position OB4.

Figure 5:
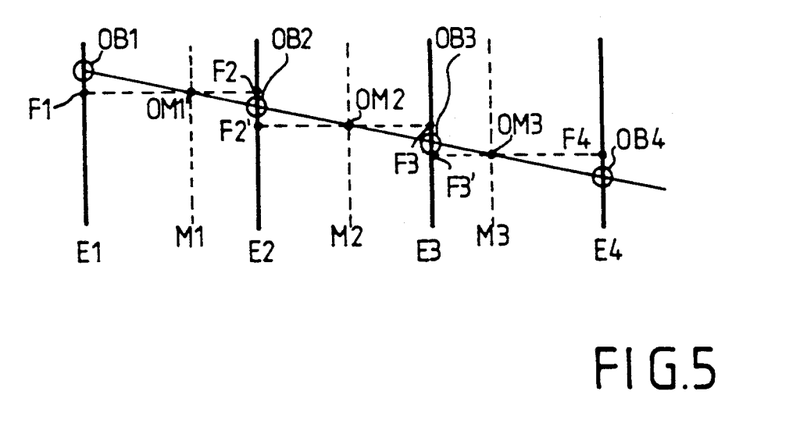
FIG. 5 shows the advantage of the coherence member.

Let it be assumed, on the one hand, that this object OB moves in a uniform background and, on the other hand, that the values of the displacement of the object and of the background are known. Now the feature of interest is the interpolation of this object OB for the missing image M1 and consequently the location OM1. The locations OB1 and OB2 give a good correlation, but F1 and F2, which correspond to the background, also give a good correlation so that at OM1 there will be, in a random manner, either an interpolation between OB1 and OB2, or an interpolation between F1 and F2. This uncertainty occurs for OM2, for OM3 so that the object or portions of the object appear for some missing images and will not appear for other missing images.

Figure 6:
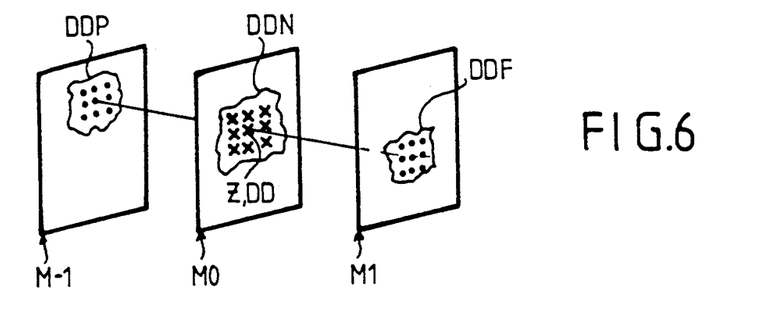
FIG. 6 illustrates the domains for which this coherence is effected.

The object of this motion vector coherence test member 80 is to avoid the hazards of motion vector decisions effected by the assigning member 50. This member contains a first processing circuit 82 which includes means for containing all the motion vectors of the future image (or the subsequent image) to be interpolated and a second processing circuit 84 having means for containing all the motion vectors of the past (or previous) image. A distribution circuit 86 relates to the image present. Different delay circuits 88, 90 and 92 produce appropriate delays to ensure that the different processing operations can be effected in a coherent manner. The distribution circuit 86 supplies from one of its outputs 87 the value of the motion vector relative to the current element as well as a certain number of motion vectors which relate to different elements forming part of a spatial domain DDN of the current element of the image. This is represented in FIG. 6 wherein the current image to be interpolated is given the reference MO. The domain DDN surrounds the current element Z to which the motion vector $\vec{DD}$ is assigned. The vector $\vec{DD}$ and the defined point for Z define different domains:

the domain DDP in the previously interpolated image M−1. This domain is centered around the element $\vec{Z}$-$\beta$. $\vec{DD}$ wherein $\beta$ is a coefficient which depends on the input frequency of the images and the output frequency of the interpolated images.

The domain DDF in the future interpolated image M+1 which is centered around the element $\vec{Z} + \beta.\vec{DD}$.

In this example described here, the domains DDF, DDN and DDP are mutually equal and equal to 3.$\Delta X$ by 3.$\Delta Y$.

The similarity circuit 95 which cooperates with the circuit 86 determines, in a first stage, whether the vector $\overrightarrow{DD}$ is similar to other vectors supplied by the circuit 86. It is said that a vector $\overrightarrow{DD}$ such as:

$$\overrightarrow{\hat{D}D} = \begin{vmatrix} \hat{D}D_H \\ \hat{D}D_V \end{vmatrix}$$

is similar to the vector $\overrightarrow{DD}$ such as:

$$\overrightarrow{\hat{D}D} = \begin{vmatrix} DD_H \\ DD_V \end{vmatrix}$$

if:

$$|DD_H - \hat{D}D_H| \le k \cdot \Delta X$$

and $$|DD_V - \hat{D}D_V| \le k' \cdot \Delta Y$$

wherein k and k' are integers such as $k \simeq k' \simeq 2$.

In a second stage, the circuit supplies the similarity signal if a predetermined number of vectors of the domain DDN are similar.

Similarly, the circuits 82 and 84 also supply similarity signals with respect to the domains DDF and DDP and with regard to this same vector $\overrightarrow{DD}$.

A final coherence member 98 supplies from its output for each current element a coherence signal which gives the result of the coherence considered for the present image and also for the previous and future images. It is said that there is coherence when at least one similarity signal is supplied by one of the circuits 82, 84 and 95. Although a processing operation is described in the foregoing using a previous image or a future image, it will be obvious that it is alternatively possible without departing from the scope of the invention, to utilize a plurality of future images and/or a plurality of previous images.

A decision filtering member 100 analyzes in a domain DSS surrounding the element z (cf. FIG. 7) the coherence decisions processed by the final coherence member 98 to supply a validation signal indicating that the vector $\overrightarrow{DD}$ assigned to the element Z is valid taking account of the coherence of the vectors assigned to the elements of this domain DSS. This domain DSS is, for example, extended to 17.$\Delta X$ by 17.$\Delta Y$. In the simplest case, this filtering operation may correspond to a majority coherence decision in the domain DSS, consequently a coherence exceeding 144.

Thus, an interpolation calculating member 102 performs for any element Z of the images to be interpolated the calculation defined by the above formula (1) when the validation signal is positive or the calculation defined by the following formula relating to a motion vector when the validation signal is negative:

$$I(Z,M) = \alpha I(Z,E1) + (1-\alpha) I(Z,E2) \tag{12}$$

Now the invention will be described in greater detail with reference to, more specifically, a standard conversion system which supplies images at the rate of 60 Hz (or 59.94 Hz), from the 50 Hz images.

Figures 7, 8A:
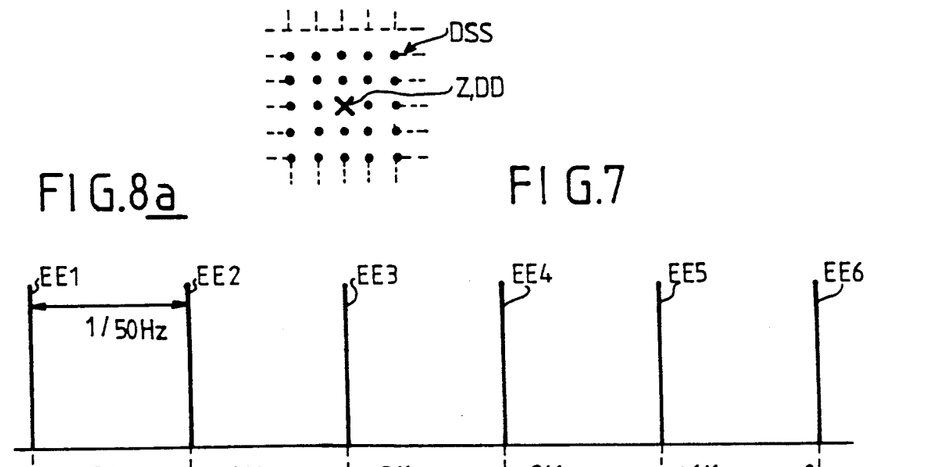
FIG. 7 illustrates the domain for which a majority is determined.
FIGS. 8a and 8b show the structure of images for effecting a standard conversion.
Figure 8B:
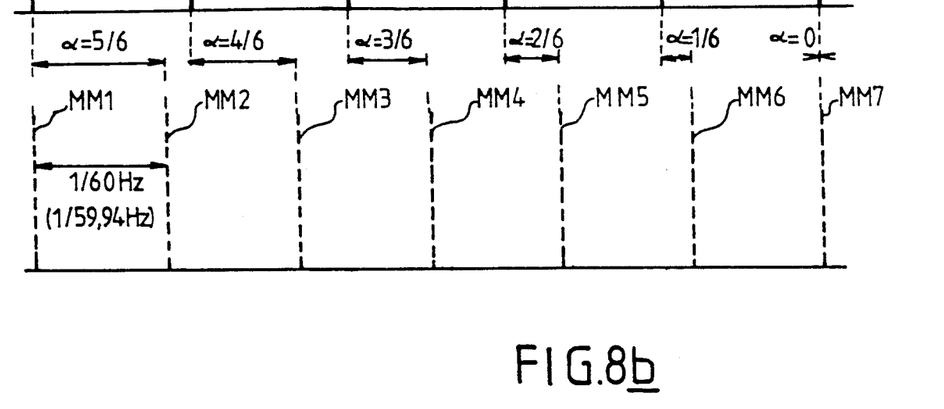

In FIG. 8a the instants at which the images EE1, EE2, EE3, ... EE6 which are produced at the rate of 50 Hz are shown by solid lines. In FIG. 8b, the instants at which the images MM1, MM2, ... MM7 must be interpolated are shown by means of broken lines. These images must be supplied at the rate of 60 Hz. The interpolated images are formed from the images EEj as a function of the parameter $\alpha$ in the following manner:

for the image MM2, the images EE1 and EE2 are used ($\alpha = 5/6$)

for the image MM3, the images EE2 and EE3 are used ($\alpha = 4/6$)

for the image MM4, the images EE3 and EE4 are used ($\alpha = 3/6$)

for the image MM5, the images EE4 and EE5 are used ($\alpha = 2/6$)

for the image MM6, the images EE5 and EE6 are used ($\alpha = 1/6$)

for the image MM7 (and MM1), EE6 (and EE1) are used ($\alpha = 0$).

Figure 9:
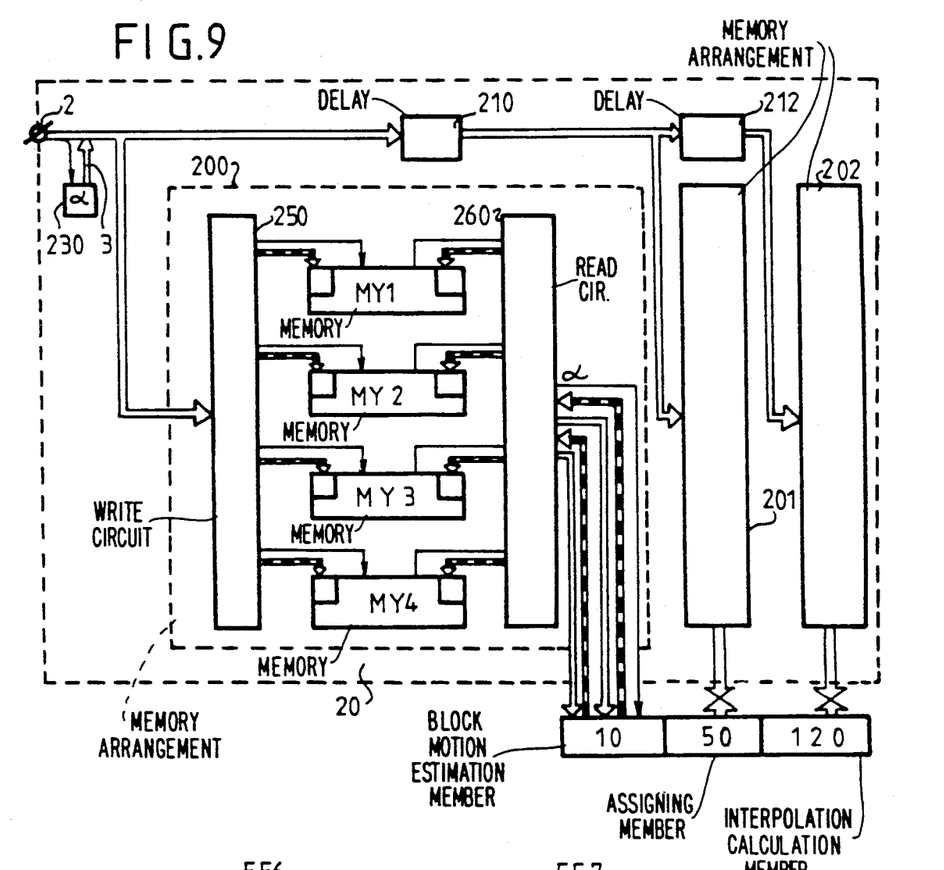
FIG. 9 is a detailed representation of the memory circuit used by the invention.

The memory circuit 20 will now be described on the basis of these considerations, which is shown in FIG. 9.

This circuit is formed by three memory arrangements 200, 201, 202 which are assigned to the estimating member 10, to the assigning member 50 and to the interpolation calculation member 120, respectively. These arrangements are separated by delay elements 210 and 212 which have for their object to delay the picture information components at the port 2 for a period of time which is sufficient to allow the processing operations effected by the different members. A circuit 230, counting the different images, supplies an interpolation mark from which $\alpha$ can be determined. This value $\alpha$ is used in the different processing operations. The interpolation mark is assigned to each incoming image.

Figure 10:
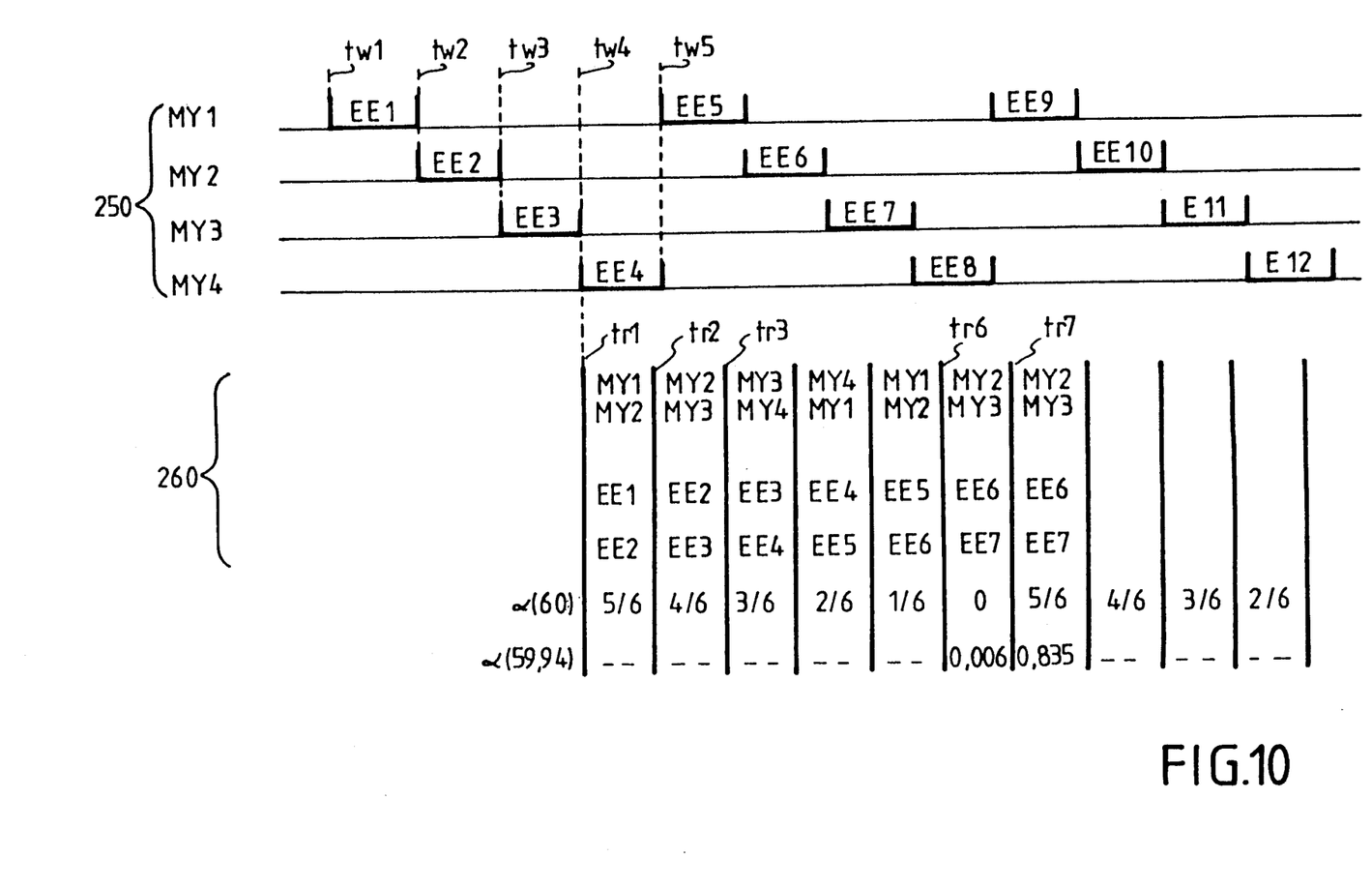
FIG. 10 is a time diagram showing the function of the circuit of FIG. 9.

The arrangement 200 is formed by four memories MY1, MY2, MY3 and MY4 whose capacity is sufficient to store all the picture elements of an image. A write circuit 250 and a read circuit 260 are assigned to the four memories. FIG. 10 shows how this arrangement functions. Each incoming image is entered in turns into one of the memories MY1 to MY4. Thus, at the instant tw1 the image EE1 is stored into the memory MY1, at the instant tw2 the image EE2 is stored into the memory MY2 and so forth for the instants tw3 and tw4 at which the images EE3 and EE4 are stored into the memories MY3 and MY4. At the instant tw5 a new cycle starts for the images EE5, EE6, EE7 and EE8 which are stored into the memories MY1 to MY4. The different instants tw1, tw2, ... tw5 are separated by a period of time equal to 1/50 Hz.

Figure 11:
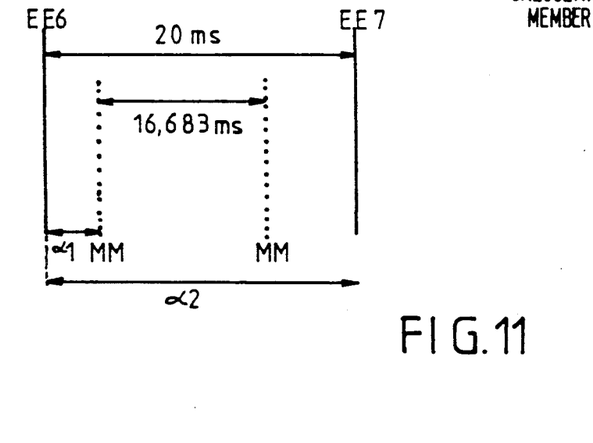
FIG. 11 illustrates a detail of the operation where a conversion to a standard at 59.94 Hz is made.

The read circuit 260 makes the information component relating to two consecutive images available for the different members. Thus, at the instant tr1 which corresponds to FIG. 10 to the instant tw4, the memories MY1 and MY2 which contain the information components of images EE1 and EE2 are enabled; thereafter at the instant tr2 the memories MY2 and MY3 are enabled as regards the images EE2 and EE3 and so forth until the instant tr6 at which an interpolation mark is detected which indicates that from two identical images two interpolations are effected. In FIG. 10 two interpolations are to be effected in the images EE6 and EE7 stored in the memories MY2 and MY3. FIG. 11 illustrates the case in which the standard conversion to the rate of 59.94 Hz is to be effected; the interpolation mark for the images EE6 and EE7 determines two values $\alpha$: $\alpha 1$ and $\alpha 2$ such as, for example: $\alpha 1 = 0.005$ and $\alpha 2 = 0.835$ since tr1 coincides with tw4.

Figure 12:
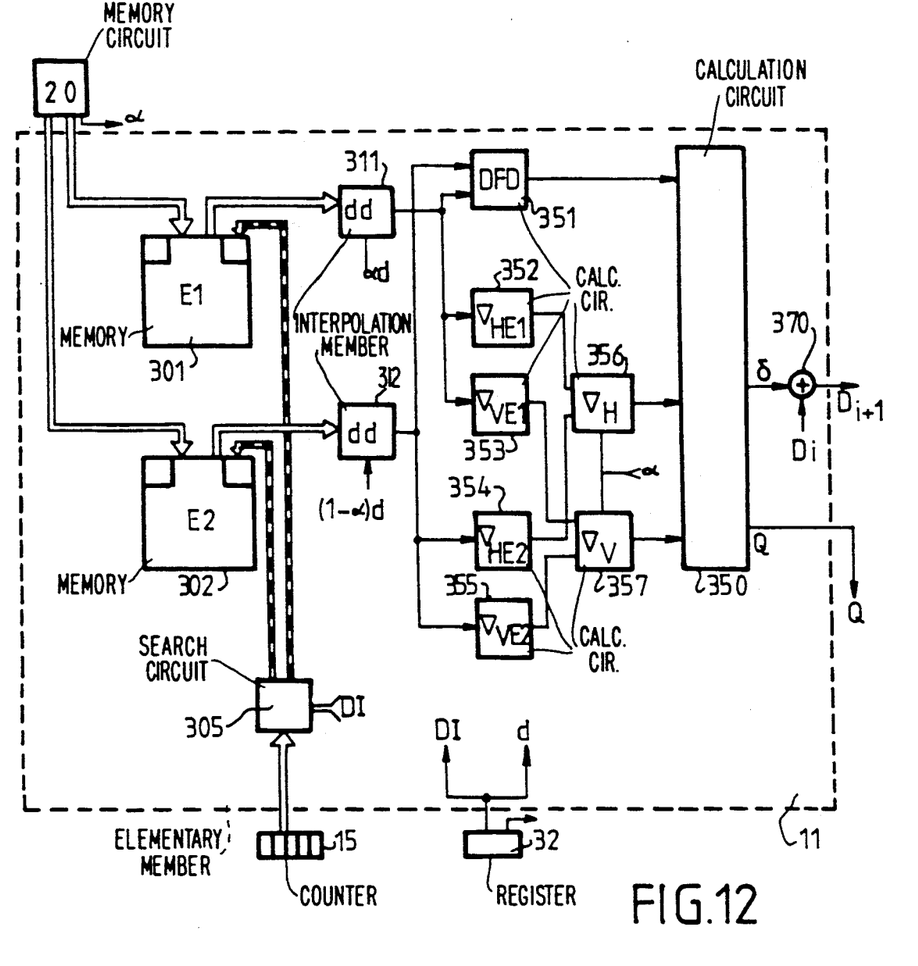
FIG. 12 shows in detail a member for estimating per block of picture elements used in accordance with the invention.

In FIG. 12 the structure of the elementary members $11' \ldots 11^{(n)}$ is shown in detail. These members comprise two working memories 301 and 302 each provided to contain the information components of two different consecutive images. These memories are loaded by the decoding circuit 17 as has been described in the foregoing.

To perform the calculation indicated in the formulae (2), (3) and (4), the value of the motion vector $D_i$ is split into two portions: an integral portion DI and a fractional portion d so that $D_i$ is written:

$$D_i = DI + d.$$

Figure 13:
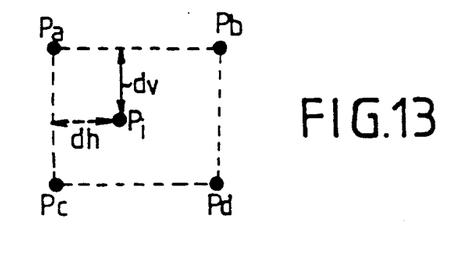
FIG. 13 shows how a linear element interpolation is effected.

Thus, a search circuit 305 will search in the memories 301 and 302 for luminance elements corresponding to the integral values DI, as a function of the content of the block counter 15. Two linear interpolation member 311 and 312 will process the fractional portion. They perform linear interpolations as a function of an input vector dd, here to determine the luminance of an element $P_i$ in accordance with the formula:

$$P_i = P_a(1-d_H)\cdot(1-d_V) + P_b\cdot d_H(1-d_V) + P_c(1-d_H)\cdot d_V + P_c\cdot d_H\cdot d_V$$

wherein $P_a$, $P_b$, $P_c$ and $P_d$ represent the luminance of existing elements surrounding the intermediate element $P_i$, and $d_H$ and $d_V$ represent the horizontal and vertical components of the vector dd. This is shown in FIG. 13.

This vector dd is equal to $\alpha d$ for the member 311 and equal to $(1-\alpha)d$ for the member 312. The value $\alpha$ is determined from the interpolation mark provided by the memory circuit 20.

A calculation circuit 350 determines the values $\delta$ and Q (see formulae (3), (4) and (10)) from operations which were previously effected by the circuits 351 to 357. A final adder 370 performs the operation which provides $D_{i+1}$.

The circuit 351 performs the calculation of DFD.

The circuits 352 and 353 perform the calculations of the horizontal and vertical gradients, respectively, of the image contained in the memory 301.

The circuits 354 and 355 perform the horizontal and vertical gradient calculations, respectively, of the image contained in the memory 302.

The circuit 356 calculates the horizontal gradient in the image to be interpolated by applying the formula (6) and the circuit 357 performs the vertical gradient calculation by applying the formula (7).

Figure 14:
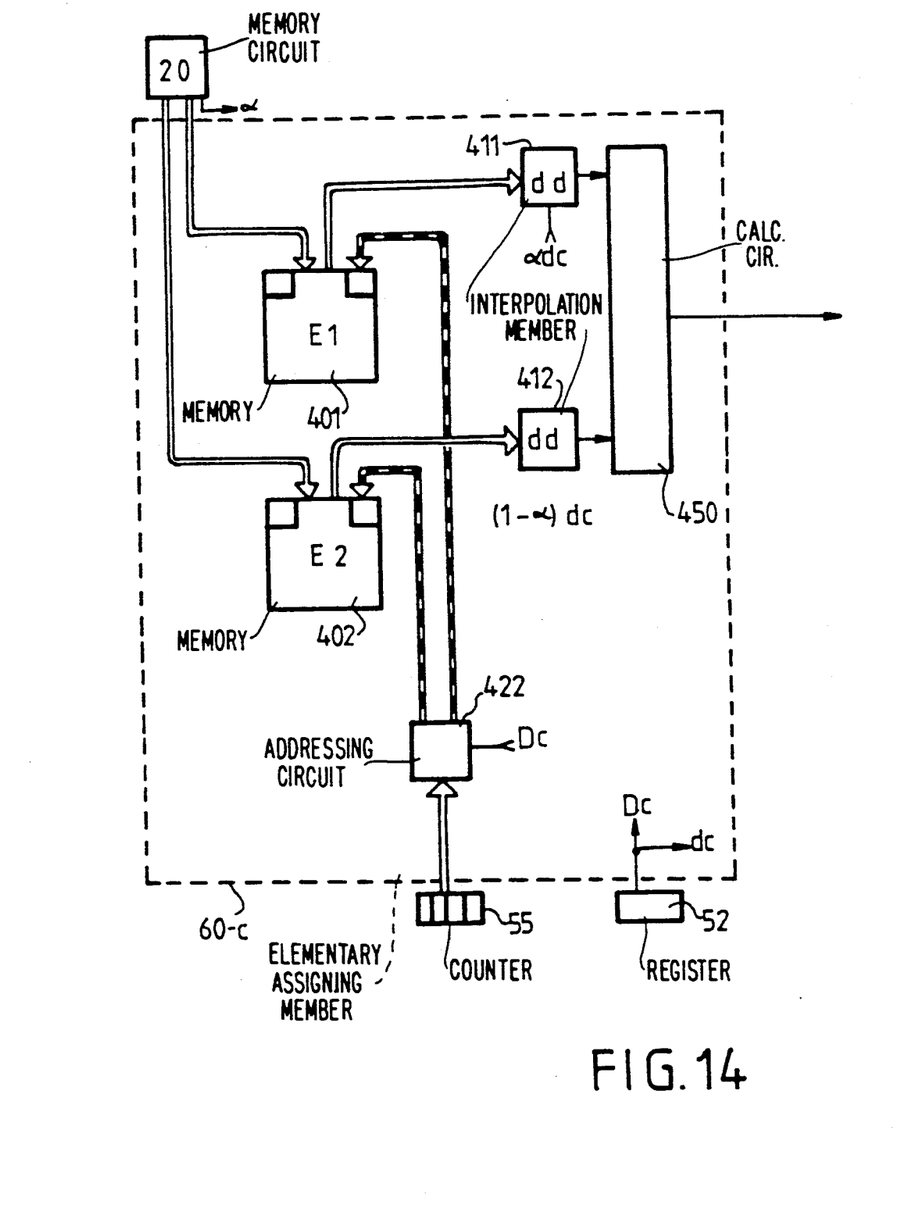
FIG. 14 shows in detail the assigning member used by the invention.

FIG. 14 shows in greater detail the structure of the elementary assigning members 60-c (c=1, . . . L). These members comprise two working memories 401 and 402 each provided to contain information components of two different consecutive images. These memories are linked to the memory circuit 20 via the decoding circuit 57. This elementary assigning member 60-c also includes, connected to each of the memories 401 and 402, two linear interpolation member 411 and 412 to effect the interpolations on the fractional portion dc of the candidate vector $D_c$.

The memories 401 and 402 are addressed from the counter 55.

As a function of the value of the candidate vector $D_c$, an addressing circuit 422 will address the relevant picture elements for the calculation to be performed by a member 450. The value $\alpha$ is processed as a function of the interpolation mark originating from the circuit 20. The member 450 performs the calculations given by the formula (11).

Figure 15:
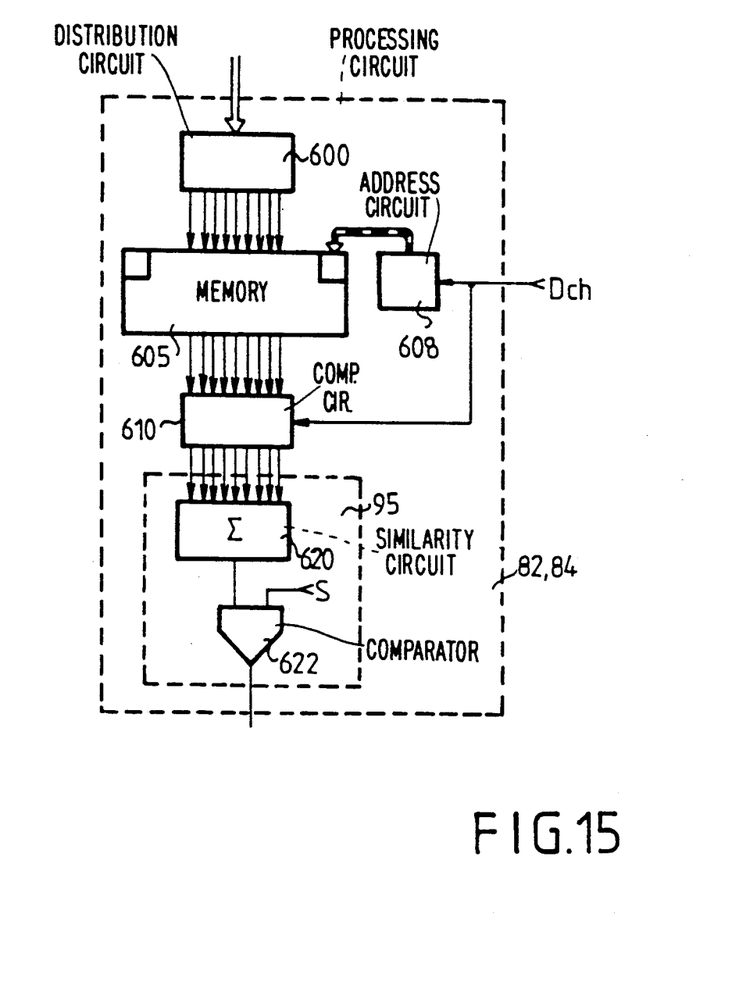
FIG. 15 shows in detail a processing circuit used in accordance with the invention.

FIG. 15 shows in greater detail the structure of the processing circuits 82 and 84 which form part of the coherence member 80. It is formed by a distribution circuit 600 which for each shift vector provides the eight other vectors corresponding to the domains DDP and DDF defined already in the foregoing. These nine vectors are stored in a memory 605. A vector Dch of which the coherence must be ensured is applied to an addressing circuit 608 used for reading the memory 605. The nine vectors of the domain DDP or DDF to be compared with the vector Dch are obtained at the output of the memory 605. The comparison circuit 610 performs this operation. Said circuit furnishes the result of each comparison to Dch. A circuit similar to the circuit 95 induces the similarity signal by counting the similar vectors by means of a circuit 620 and by comparing them to a threshold value by means of the comparator 622.

Figure 16:
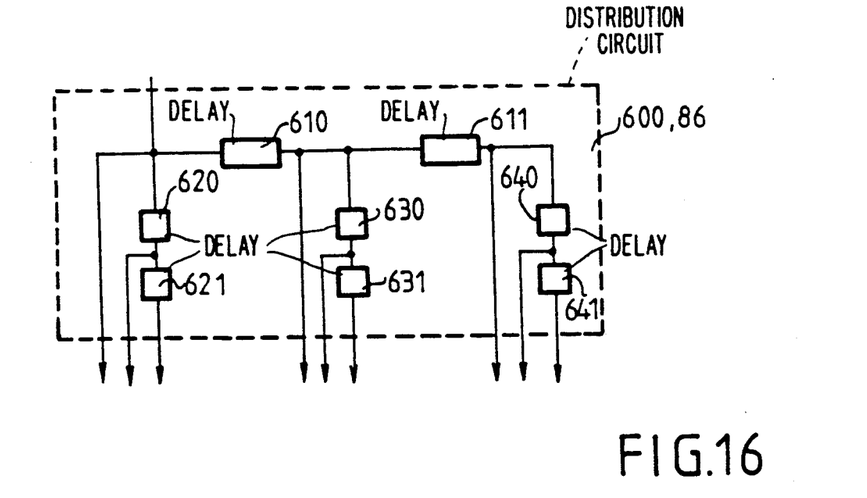
FIG. 16 shows in detail a distribution circuit used in accordance with the invention.

FIG. 16 shows in detail the distribution circuit 600 which resembles the distribution circuit 86. These circuits are formed by line delay elements 610 and 611 which are arranged in cascade and produce a delay equal to the duration of a line. At the input of the element 610 which constitutes the input of these circuits, two picture element delay element 620 and 621 are disposed which each provide a delay equal to the duration separating two picture elements. In the same manner two picture element delay elements 630 and 631 are disposed at the output of the element 610 and two picture element delay elements 640 and 641 are disposed at the output of the element 611. The output signals of the circuits 600, 86 are examined at the input of the element 610 and at the outputs of the elements 620, 621, 610, 630, 631, 611, 640 and 641. It will be seen that these outputs adequately furnish the indications required for the domains DDF, DDN and DDP.

Figure 17:
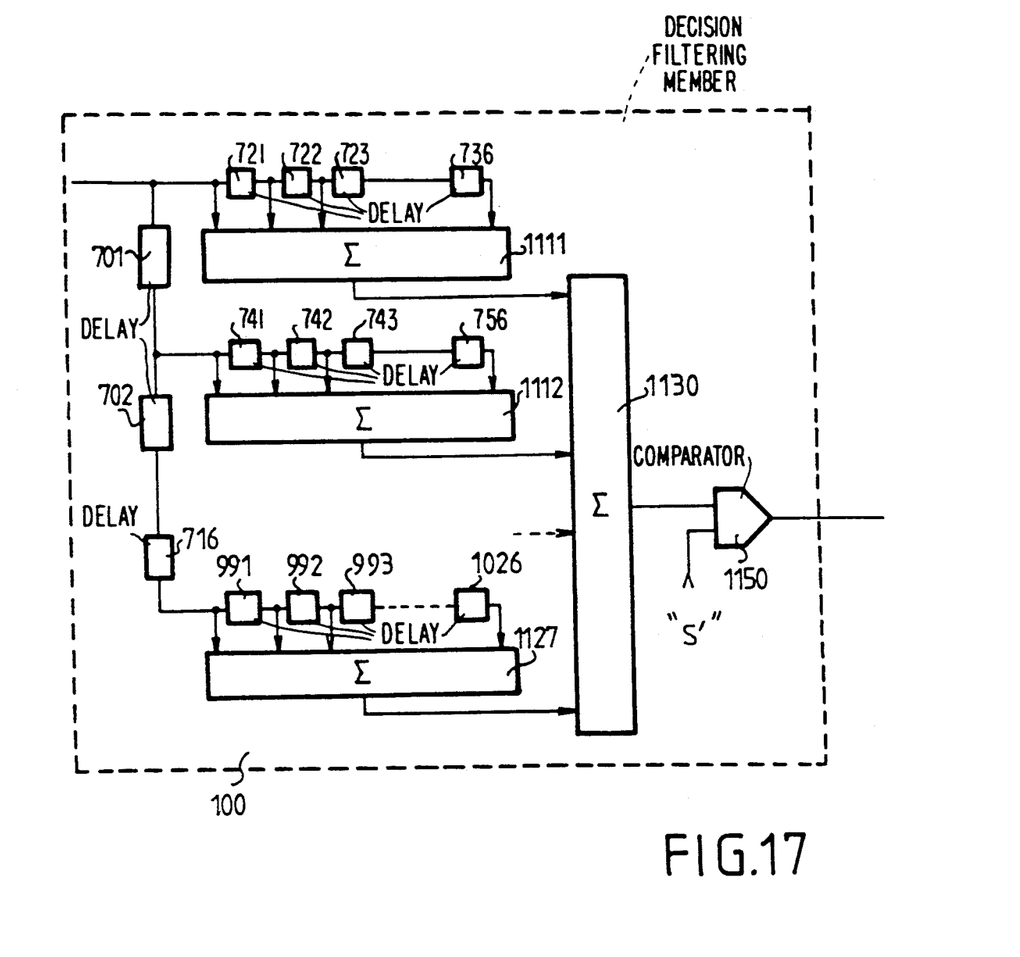
FIG. 17 shows in detail a majority circuit used in accordance with the invention.

FIG. 17 shows in detail the decision filtering member 100 which here performs a simple majority decision. It is formed from a cascade arrangement of line delay elements 701 to 716, the number of delay elements depending on the vertical quantity of the domain DSS $(17.\Delta X * 17\Delta Y)$. To the input of the element 701 and to the outputs of the elements 701, 702, . . . and 716 there are connected different cascade arrangements of picture element delay elements 721, 722, . . . , 736 for the first, 741, 742, . . . 756 for the second, and so forth until the last one with the elements 991, 992, . . . 1026. Different adders 1111 to 1127 add together the results of these cascade arrangements. A final adder 1130 takes the sum of the results of the different adders 1111 to 1126 for a comparison to be effected by a member 1150. So, if a sum exceeds $S' = 144$ [$\_\sim(17*17)/2$] the signal is declared valid; if the sum is less, the validity is not recognized. It is alternatively possible to weight the signals at the level of each delay element, this is then called the weighted sum.

We claim:

1. An arrangement for interpolating images in an input sequence of images by motion estimation and compensation, said arrangement comprising:
   motion estimation means for estimating motion vectors for blocks of picture elements;
   means for comparing, separately for each picture element of a block, a plurality of motion vectors estimated for said block and for blocks adjacent to said block to determine a selected motion vector for each picture element separately; and
   means for interpolating an image in dependence on said selected motion vectors.

2. An arrangement for interpolating images as claimed in claim 1, characterized in that said arrangement includes a motion vector coherence test member for supplying a validation signal for each motion vector determined by said comparing means for a picture element, said motion vector coherence test member supplies said validation signal by comparing corresponding picture elements situated in different images in said sequence of images.

3. An arrangement for interpolating images as claimed in claim 1 or 2, characterized in that the motion estimation means is of the recursive type.

4. An arrangement for interpolating images as claimed in claim 3, characterized in that the motion estimation means repeats the estimation one time.

5. An arrangement for interpolating images as claimed in claim 1, characterized in that said comparing means includes means for evaluating a "relative cost" of each of said plurality of motion vectors separately for each picture element of the image to be interpolated.

6. An arrangement for interpolating images as claimed in claim 2, characterized in that the motion vector coherence test member comprises a counting member for counting motion vectors which are similar to the motion vector determined for to the current picture element and relate to picture elements positioned in a first domain surrounding the current picture element and picture elements positioned in a second domain surrounding the picture element which corresponds to the current picture element in at least a previous image and picture elements positioned in a third domain which surrounds the picture element corresponding to the current picture element in at least a future image; a similarity determining member assigned to the first, second and third domains for supplying a similarity signal when a predetermined number of similar motion vectors have been counted; a coherence member for supplying a coherence signal when at least one similarity signal relating to the first, second and third domains has been detected; and a decision filtering member for taking the sum of the coherence signals relating to picture elements positioned in a fourth domain surrounding the current picture element and for supplying said validation signal when said sum exceeds a predetermined threshold.

7. An arrangement for interpolating images as claimed in claim 6, characterized in that the interpolating means effects, for each current picture element, a motion compensated interpolation using the motion vector if the motion vector is validated by the validation signal, or an interpolation using the zero motion vector if there is no validation signal.

8. An arrangement for interpolating images as claimed in claim 3, characterized in that the motion estimation means includes a plurality of elementary estimation members for each supplying, for each block of the image to be interpolated, a block motion vector from an initial motion vector and for supplying a quality information concerning said block motion vector; and a decision member for supplying the block motion vector retained from among the motion vectors processed by said elementary estimation members as a function of the quality information.

9. An arrangement for interpolating images as claimed in claim 8, characterized in that the initial motion vectors are either the zero motion vector, or the retained block motion vector attributed to a previous contiguous block positioned above and to the right of the current block, or the retained block motion vector attributed to the contiguous previous block positioned to the left of the current block.

* * * * *